US010607213B2

(12) United States Patent
Howe

(10) Patent No.: US 10,607,213 B2
(45) Date of Patent: Mar. 31, 2020

(54) METHOD AND SYSTEM OF PROVIDING FINANCIAL TRANSACTIONS FOR THE VISUALLY IMPAIRED

(71) Applicant: MasterCard International Incorporated, Purchase, NY (US)

(72) Inventor: Justin Howe, Oakdale, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1086 days.

(21) Appl. No.: 13/693,333

(22) Filed: Dec. 4, 2012

(65) Prior Publication Data

US 2014/0156510 A1    Jun. 5, 2014

(51) Int. Cl.
*G06Q 20/34* (2012.01)
*G06Q 20/32* (2012.01)
*G06Q 20/20* (2012.01)

(52) U.S. Cl.
CPC ............ *G06Q 20/34* (2013.01); *G06Q 20/20* (2013.01); *G06Q 20/32* (2013.01); *G06Q 20/3272* (2013.01)

(58) Field of Classification Search
CPC ........ G06Q 10/00; G06Q 20/00; G06Q 30/00; G06Q 40/00
USPC ........................................ 705/3–44; 709/206
See application file for complete search history.

(56) References Cited

U.S. PATENT DOCUMENTS

| 6,021,397 | A | * | 2/2000 | Jones et al. | 705/36 R |
| 8,639,621 | B1 | * | 1/2014 | Ellis | G06Q 30/0255 705/41 |
| 8,700,003 | B2 | * | 4/2014 | Klein | G07C 13/00 455/411 |
| 8,924,292 | B1 | * | 12/2014 | Ellis | G06Q 30/0261 705/41 |
| 8,930,271 | B1 | * | 1/2015 | Ellis | G06Q 30/0224 705/41 |
| 2001/0042785 | A1 | * | 11/2001 | Walker et al. | 235/379 |
| 2004/0117302 | A1 | * | 6/2004 | Weichert et al. | 705/40 |
| 2007/0016643 | A1 | * | 1/2007 | Boss et al. | 709/206 |
| 2010/0125509 | A1 | * | 5/2010 | Kranzley | G06Q 20/20 705/17 |
| 2011/0184853 | A1 | * | 7/2011 | Mark et al. | 709/206 |
| 2012/0310760 | A1 | * | 12/2012 | Phillips | G06Q 40/02 705/26.1 |

(Continued)

*Primary Examiner* — Frantzy Poinvil
(74) *Attorney, Agent, or Firm* — Buchanan Ingersoll & Rooney PC

(57) ABSTRACT

A method for audibly communicating transaction details includes: storing payment card details for a payment card, the card details including a payment card number; receiving transaction details for a financial transaction involving the payment card, the transaction details including a transaction amount; and audibly emitting the transaction amount for the financial transaction. A method for audibly communicating account information which includes: capturing an image of a payment card; processing the captured image of the payment card to identify payment card details, the card details including a payment card number; transmitting the identified card details; receiving account details for a financial account associated with the payment card, the account details including at least an account balance; and audibly emitting the account balance for the financial account.

42 Claims, 10 Drawing Sheets

(56) References Cited

U.S. PATENT DOCUMENTS

| | | | |
|---|---|---|---|
| 2013/0144731 A1* | 6/2013 | Baldwin et al. | 705/17 |
| 2013/0185124 A1* | 7/2013 | Aaron | G07B 13/00 |
| | | | 705/13 |
| 2014/0172577 A1* | 6/2014 | Rephlo | G06Q 20/40 |
| | | | 705/14.64 |
| 2015/0178862 A1* | 6/2015 | Angrish | G06Q 20/202 |
| | | | 705/5 |

* cited by examiner

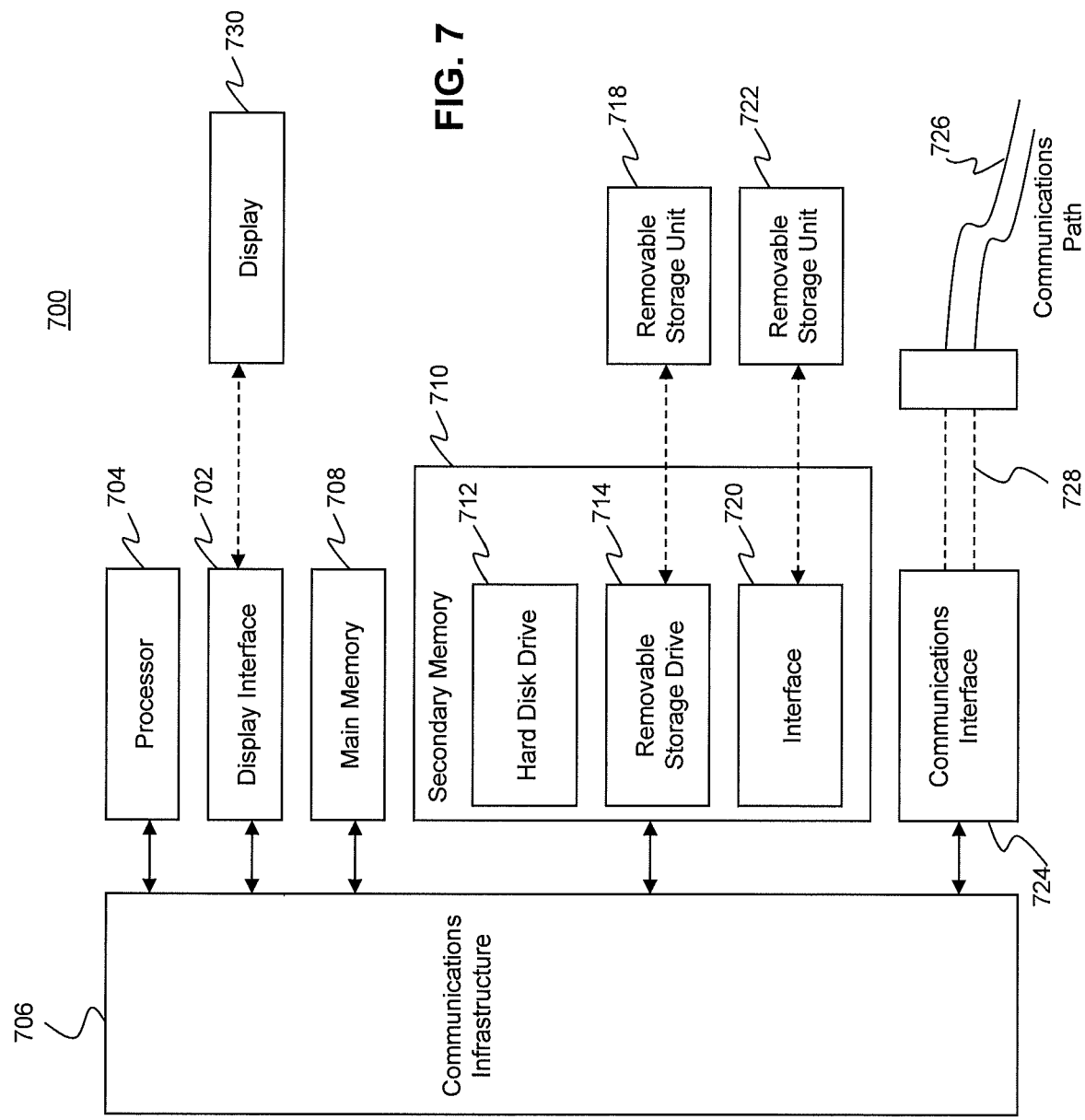

METHOD AND SYSTEM OF PROVIDING FINANCIAL TRANSACTIONS FOR THE VISUALLY IMPAIRED

FIELD

The present disclosure relates to the providing of financial transactions for the visually impaired, specifically using a smartphone to provide audible information regarding transactions and balance inquiries to a visually impaired user with minimal user instruction.

BACKGROUND

Technology regarding payment systems and the providing of payment by a user has advanced considerably in recent years. Payment cards capable of contactless payments have been developed, as has technology for storing payment card information in a smartphone for use in contactless payments. In previous times a consumer was required to furnish their payment card, which would have its impression taken by the merchant. In present times, a consumer can pay for a transaction with the same payment card account using their phone or a contactless payment card, without their payment card leaving their wallet. However, despite all of the advances in payment systems, little has been done to better the experience for visually impaired consumers.

When a consumer engages in a financial transaction, the cashier or clerk typically audibly notifies the consumer of the transaction amount. For visually-abled consumers, the consumer is able to read the transaction amount from the point-of-sale terminal or receipt to verify the amount being charged is as stated by the cashier. However, for a visually impaired consumer, they must rely on the cashier or clerk to be stating the transaction amount correctly. This provides an opportunity for less trustworthy parties to defraud the visually impaired consumer, by charging an additional amount beyond what the consumer is expecting to pay. Whether this occurs rarely or not, the perception that it could is discomforting and potentially inhibiting of engaging in I such transactions. If a visually impaired consumer is defrauded when using their payment card, they are usually unable to discover the discrepancy as to the payment versus their expectation until a later time and/or date when they can verify their payment history.

For unusual transactions, text messages or phone calls can be sent to a card holder, but these are designed as fraud detection. There are also proposed systems that require a consumer to verify a transaction through text or other forms of messaging, but these interfere with timely authorization of transactions.

On a different note, many consumers, both visually-abled and visually impaired, consistently possess smartphones and other mobile communication devices. Many devices include the capability of audibly reading text to a user, such as to assist the visually impaired. While these devices can assist the visually impaired in navigating display menus and the like, these facilities are not designed as methods of assisting a visually impaired consumer with financial transactions.

Thus, there is a need for a technical solution to provide details of financial transactions to the visually impaired that does not interfere with a timely authorization process and does not require substantial changes to the legacy financial transaction processes.

SUMMARY

The present disclosure provides a description of a systems and methods of providing financial transactions to visually impaired consumers by audibly communicating transaction details and/or account information.

A method for audibly communicating transaction details includes: storing, in a database of a mobile communication device, payment card details for a payment card account, wherein the payment card details include at least a payment card number; receiving, by a receiving device of the mobile communication device, transaction details for a financial transaction involving the payment card, wherein the transaction details include at least a transaction amount; and audibly emitting, by an audio transmitter of the mobile communication device, at least the transaction amount for the financial transaction.

A method for audibly communicating account information: capturing, by an imaging device, an image of a payment card; processing, by a processing device, the captured image of the payment card to identify payment card details, wherein the payment card details include at least a payment card number; transmitting, by a transmitting device, the identified payment card details; receiving, by a receiving device, account details for a financial account associated with the payment card, wherein the account details include at least an account balance; and audibly emitting, by an audio transmitter, at least the account balance for the financial account.

A mobile communication device for audibly communicating transaction details which includes a database, a receiving device, and an audio transmitter. The database is configured to store payment details for a payment card account, wherein the payment card details include at least a payment card number. The receiving device is configured to receive transaction details for a financial transaction involving the payment card, wherein the transaction details include at least a transaction amount. The audio transmitter is configured to audibly emit at least the transaction amount for the financial transaction.

A system for audibly communicating account information includes an imaging device, a processing device, a transmitting device, a receiving device, and an audio transmitter. The imaging device is configured to capture an image of a payment card. The processing device is configured to process the captured image of the payment card to identify payment card details, wherein the payment card details include at least a payment card number. The transmitting device is configured to transmit the identified payment card details. The receiving device is configured to receive account details for a financial account associated with the payment card, wherein the account details include at least an account balance. The audio transmitter is configured to audibly emit at least the account balance for the financial account.

Though initially conceived of for use to assist the visually impaired, the disclosed systems could be used in other applications. For instance, the audible communication of the transaction amount could be an effective fraud notification to consumers. For example, if a transaction just occurred on a card but a card holder (whether visually impaired or not) is unaware of it, the audible notice could alert a card holder of the potential fraud (whether visually impaired or simply distracted from seeing a visual notice or alert.

Further, the audible communication of the transaction amount could be viewed as a personal budgeting tool. For example, many people do not look at the amount of a transaction when paid on credit, particularly for NFC (Near Field Communications) transactions, but having the amount audibly communicated to them will likely be an effective way to emphasize the purchase.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIG. 7 is a block diagram illustrating system architecture of a computer system in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Providing Financial Transactions for the Visually Impaired

Figure 1:
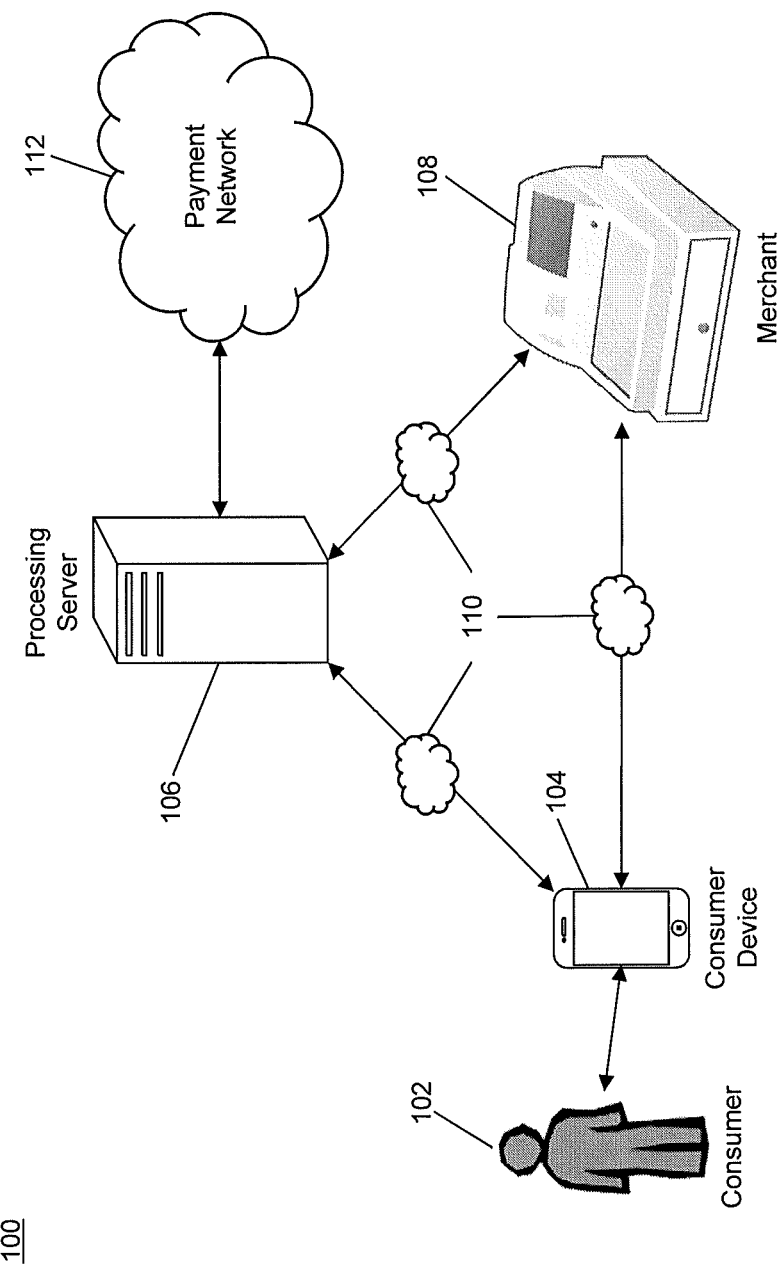
FIG. 1 is a high level architecture illustrating a system for providing financial transactions to the visually impaired in accordance with exemplary embodiments.

FIG. 1 is a block diagram illustrating a system 100 for providing financial transactions for the visually impaired by audibly communicating transaction details and account details to a visually impaired consumer.

The system 100 may include a consumer 102 in possession of a consumer device 104. The consumer device 104 may be a mobile communication device configured to perform the functions as discussed herein. The consumer device 104, discussed in more detail below, may be a smart phone, mobile phone, tablet computer, etc., or nearly any other portable electronic device capable of at least receiving electronic communications, as will be apparent to persons having skill in the relevant art.

The consumer device 104 may be configured to identify card details corresponding to a payment card account issued to the consumer 102. Payment cards may include credit cards, debit cards, check cards, controlled payment numbers, virtual card numbers, checks, payment tokens, etc. Payment card accounts as discussed herein may include any type of financial account for which there may be a corresponding payment card, such as a credit card account, checking account, savings account, online or virtual account (e.g., PayPal®), etc. Additional types of payment cards and payment card accounts suitable for use in the systems and methods as disclosed herein will be apparent to persons having skill in the relevant art. Methods for identifying card details are discussed in more detail below and may include using optical character recognition to process an image of the payment card, receiving card details via a network 110, reading card details from the payment card using near field communication, reading card details from the payment card's magnetic strip, etc. The consumer device 104 may store the card details for use in subsequent transactions.

The consumer device 104 may transmit the card details or an indication of the payment card to a processing server 106 via the network 110. The processing server 106 may be a part of a payment network 112. The payment network 112 may be any type of network, system, etc. used to transfer money for the funding of a financial transaction, such as those payment networks operated by MasterCard, VISA, etc. Payment networks may be configured to process financial transactions, electronic fund transfers, online banking transactions, automated teller machine (ATM) transactions, etc., which may include the processing of payment cards or payment card accounts as discussed herein. Methods for processing financial transactions via the payment network 112 will be apparent to persons having skill in the relevant art and may include processing a transaction via the traditional four party system including consumer (e.g., the consumer 102), merchant (e.g., the merchant 106), an issuer, and an acquirer.

The network 110 may include one or more different protocols and transmission mechanisms suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art.

The processing server 106 may associate the payment card with the consumer 102 and/or the consumer device 104. The consumer 102 may then engage in a financial transaction with the merchant 108 using the captured payment card. The merchant 108 may provide a transaction amount to the consumer 102. In an instance where the consumer 102 is visually impaired, he or she may be unable to verify the amount actually charged to the payment card. The merchant 108 may submit an authorization request for the financial transaction to the processing server 106 via the network 110.

The processing server 106 may process the financial transaction via the payment network 112 using traditional methods as will be apparent to persons having skill in the relevant art. The processing server 106 may identify the association of the consumer 102 and/or the consumer device 104 with the payment card used in the financial transaction. The processing server 106 may then transmit to the consumer device 104 transaction details for the financial transaction, wherein the transaction details include at least the actual transaction amount for which the payment card was charged.

The consumer device 104 may receive the transaction details and may be configured to audibly emit the transaction amount to the consumer 102 (e.g., via a speaker, headphones, etc., or nearly any other mechanism that facilitates communication with the visually impaired). The consumer 102 may then confirm that the payment card was charged for the amount as indicated by the merchant 108 prior to the processing of the transaction. In some embodiments, if the charge is different than was indicated by the merchant 108, the consumer 102 may input a request for a chargeback to the consumer device 104 or nearly any other process to try to correct or contest the transaction. The consumer device 104 may then transmit the request to the processing server 106, which may then process a chargeback for the transaction or otherwise indicate that the transaction is in dispute.

Consumer Device

Figure 2:
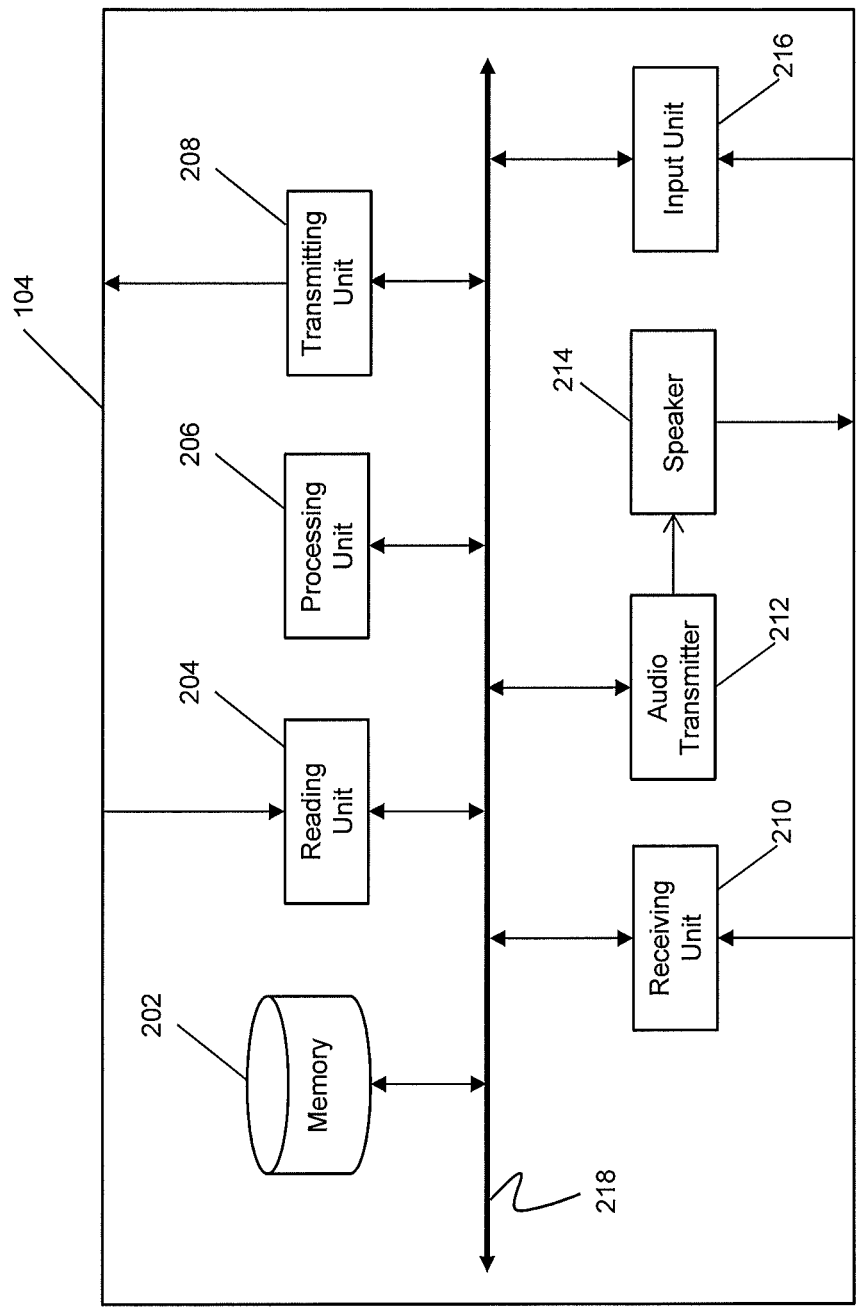
FIG. 2 is a block diagram illustrating electronic components of a mobile device for use in the system of FIG. 1 in accordance with exemplary embodiments.

FIG. 2 is a block diagram illustrating electronic components of an embodiment of the consumer device 104. It will be apparent to persons having skill in the relevant art that the consumer device 104 may be in any suitable configuration for performing the functions as disclosed herein, such as the configuration of the computer system 700 illustrated in FIG. 7 and discussed in more detail below.

The consumer device 104 may include at least a memory 202, a reading unit 204, a processing unit 206, a transmitting unit 208, a receiving unit 210, an audio transmitter 212, a speaker 214, and an input unit 216. Each of the components may be configured to communicate via a bus 218. Suitable types and configurations of the bus 218 and other components will be apparent to persons having skill in the relevant art.

The memory 202 may be configured to store data related to card details for at least one payment card issued to the consumer 102. The memory 202 may be any type of suitable computer readable media, such as optical storage (e.g., a compact disc, digital versatile disc, Blu-ray disc, etc.), magnetic tape storage (e.g., a hard disk drive), etc. The card details stored in the memory 202 may include at least a card number (e.g., account number) corresponding to the payment card. In some embodiments, card details may further include cardholder name, expiration date, routing number, and security code.

The reading unit 204 may be configured to capture details of a payment card and/or a payment card account issued to the consumer 102. In one embodiment, the reading unit 204 may be an imaging unit configured to capture an image of a payment card, such as a camera. The processing unit 206 may be configured to process the captured payment card image to identify the card details for the payment card. In a further embodiment, the processing unit 206 may identify the card details using optical character recognition. In another embodiment, the reading unit 204 may be configured to read payment card or payment card account details via near field communication (NFC). Methods for reading (e.g., receiving) data using NFC will be apparent to persons having skill in the relevant art. The consumer 102 may place a payment card configured for contactless payments near the reading unit 204 of the consumer device 104, which may then capture the card details for storage in the memory 202. In yet another embodiment, the reading unit 204 may be configured to read a magnetic strip included on a payment card. The reading unit 204 may read the magnetic strip to identify payment card data encoded therein. Virtually any other reader could be used. The processing unit 206 may then decode the data to identify card details corresponding to the payment card.

The processing unit 206 may be further configured to store the identified card details as data in the memory 202. The transmitting unit 208 may be configured to transmit the identified and/or stored card details corresponding to the payment card to the processing server 106 (e.g., via the network 110). The processing server 106 may associate the payment card with the consumer 102 and the consumer device 104. Once the consumer 102 has used the payment card in a financial transaction, the processing server 106 may transmit transaction details for the financial transaction to the consumer device 104, which may be received by the receiving unit 210. The transaction details may include at least the transaction amount for the financial transaction.

The processing unit 206 may identify the transaction amount in the transaction details and cause the audio transmitter 212 to transmit an audio signal to the speaker 214. The speaker 214 may then audibly emit the audio signal, which may audibly communicate the transaction details to the consumer 102. In some embodiments, the memory 202 may store an application program, which, when executed by the processing unit 206, may operate in the background of the consumer device 104 to monitor for the receipt of transaction details to trigger the audible communication of the transaction amount. In other embodiments, the receiving unit 210 may receive a message (e.g., a multimedia message service (MMS) message). In a further embodiment, the message may include an audio file configured to communicate the transaction amount. In an alternative further embodiment, the message may include text of the transaction amount and the memory 202 may include an application program configured to convert the text into an audio signal (e.g., voice). In an even further embodiment, the text may be converted and the audio signal emitted automatically upon receipt of the message. In some embodiments, the audible communication of the transaction amount by the speaker 214 may occur subsequent to an instruction provided by the consumer 102 and input via the input unit 216.

As mentioned above, this audible communication of the transaction amount can be used to assist the visually impaired in confirming the amount charged, and/or can be used as a fraud notification to consumers (whether visually impaired or not). For example, if a transaction just occurred on a card but a card holder is unaware of it, the audible communication could alert a card holder of the potential fraudulent transaction, even if the person is visually impaired or simply unable to pay attention to a visual notice. As also noted above, the audible communication of the transaction amount can serve as a personal budgeting tool, particularly for people may not look at the amount of a transaction when paid on credit, but having the amount spoken to them will emphasize the purchase amount.

In some embodiments, the input unit 216 may be configured to receive a request for chargeback input from the consumer 102. The request for chargeback may indicate that the consumer 102 disputes the transaction amount charged to the payment card. The transmitting unit 208 may transmit the request for chargeback to the processing server 106, which may then process the request accordingly using systems and methods apparent to persons having skill in the relevant art. The input unit 216 may be a keyboard, click wheel, tactile touch screen, microphone, etc.

In some embodiments, the receiving unit 210 may be configured to receive data related to card details for the payment card from the processing server 106. In some instances, the consumer device 104 may receive the card details to be stored in the memory 202 without being required to capture and process an image of the payment card via the imaging unit 204 and processing unit 206. For example, the consumer 102 may contact the processing server 106 (e.g., via telephone, computer, etc.), to have the payment card associated with the consumer 102 and the consumer device 104.

Capturing Payment Card Details

Figure 3:
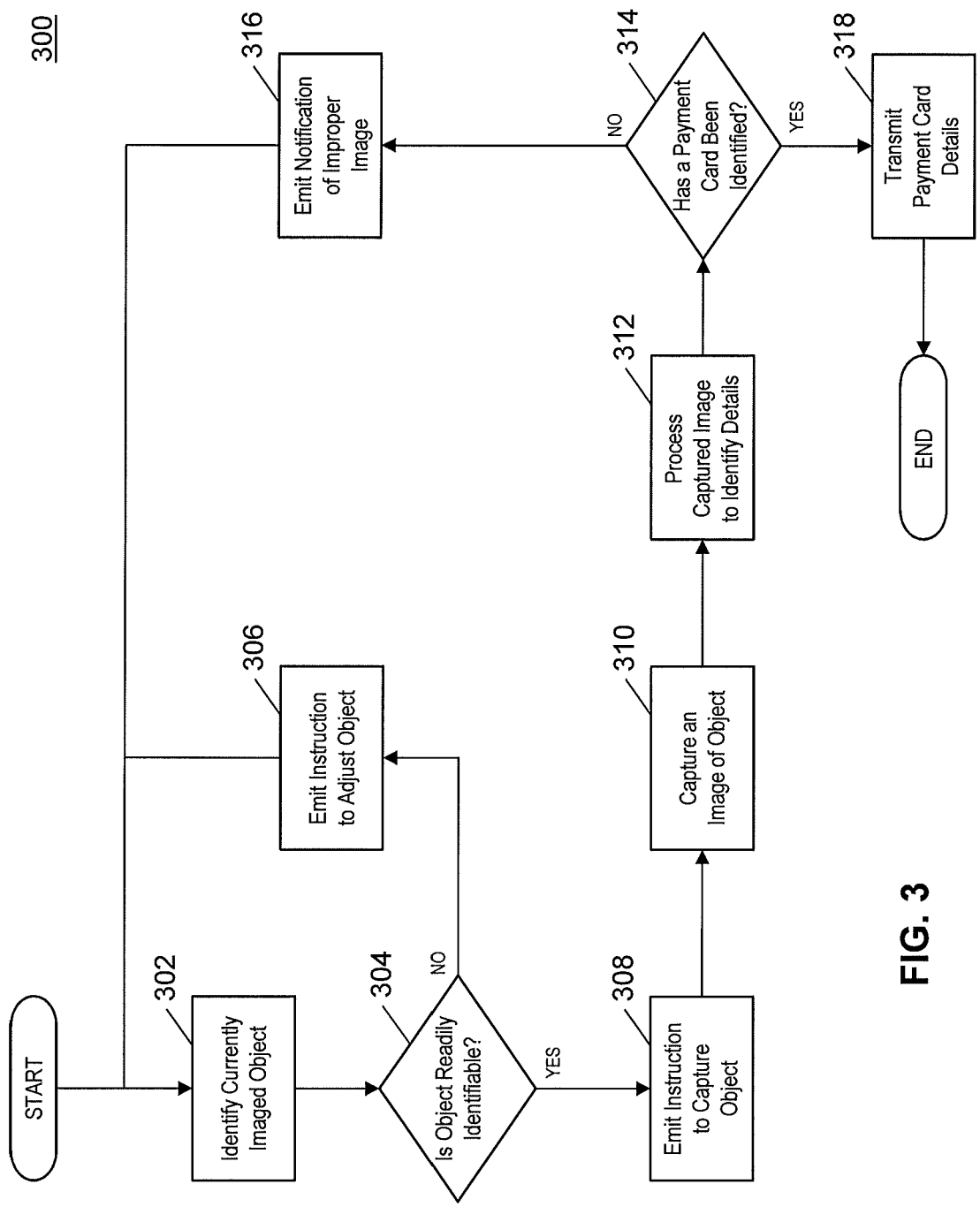
FIG. 3 is a flow chart illustrating a method for identifying a payment card account using optical character recognition in accordance with exemplary embodiments.

FIG. 3 illustrates a method 300 for capturing payment card details by the consumer device 104 using optical character recognition for a payment card placed in the field of view of the imaging unit 204 of the consumer device 104 by the consumer 102. It will be apparent to persons having skill in the relevant art that the method 300 for capturing payment card details is provided by means of example only, and is not exhaustive as to methods for capturing payment card details suitable for use in the systems and methods as discussed herein. For example, alternative methods for the capturing of payment card details may include using NFC to receive card details from the payment card, or using the reading unit 204 to read payment card details encoded in the magnetic strip included in the payment card.

In step 302, the processing unit 206 may identify the object that is currently imaged in the field of view of the imaging unit 204. In step 304, the processing unit 206 will determine if the object is readily identifiable (e.g., if the card details would be discernible in a captured image). If the object is not readily identifiable, then, in step 306, the consumer device 104 may emit an instruction to the consumer 102 to adjust the object and/or the consumer device 104 to properly capture the object. For example, the consumer device 104 may instruct the consumer 102 to move the consumer device 104 closer or further away from the object, or to adjust the orientation of the object and/or consumer device 104 in a specific direction or rotation. In one embodiment, the instruction may be an audible instruction provided via the audio transmitter 212 and the speaker 214.

If the object is readily identifiable then, in step 308, the consumer device 104 may emit an instruction to the consumer 102 to capture the object (e.g., the payment card). In one embodiment, the instruction may be an audible instruction. In step 310, the imaging unit 204 may capture an image of the object. It will be apparent to persons having skill in the relevant art that in some embodiments, step 308 may be optional, and the processing unit 206 may, when it is determined that the object is readily identifiable, cause the imaging unit 204 to capture the image of the object automatically.

In step 312, the processing unit 206 may process the captured image to identify card details for the payment card. In some embodiments, the consumer 102 may be instructed (e.g., via the audio transmitter 212 and the speaker 214) to capture an image of the reverse side of the payment card, such as to capture a security code or other card details. The processing unit 206 may store the captured card details as data in the memory 202 of the consumer device 104.

In step 314, the processing unit 206 may determine if the processing of the captured image was successful. If the processing is unsuccessful, then, in step 316, the consumer device 104 may emit a notification to the consumer 102 of the improper image. In some embodiments, the notification may further instruct the consumer 102 to recapture the payment card. If the processing of the image was successful, then, in step 318, the transmitting unit 208 may transmit the identified payment card details to the processing server 106, such as for associating the consumer 102 and/or the consumer device 104 with the payment card.

Communicating Transaction Details to a Visually Impaired Consumer

Figure 4:
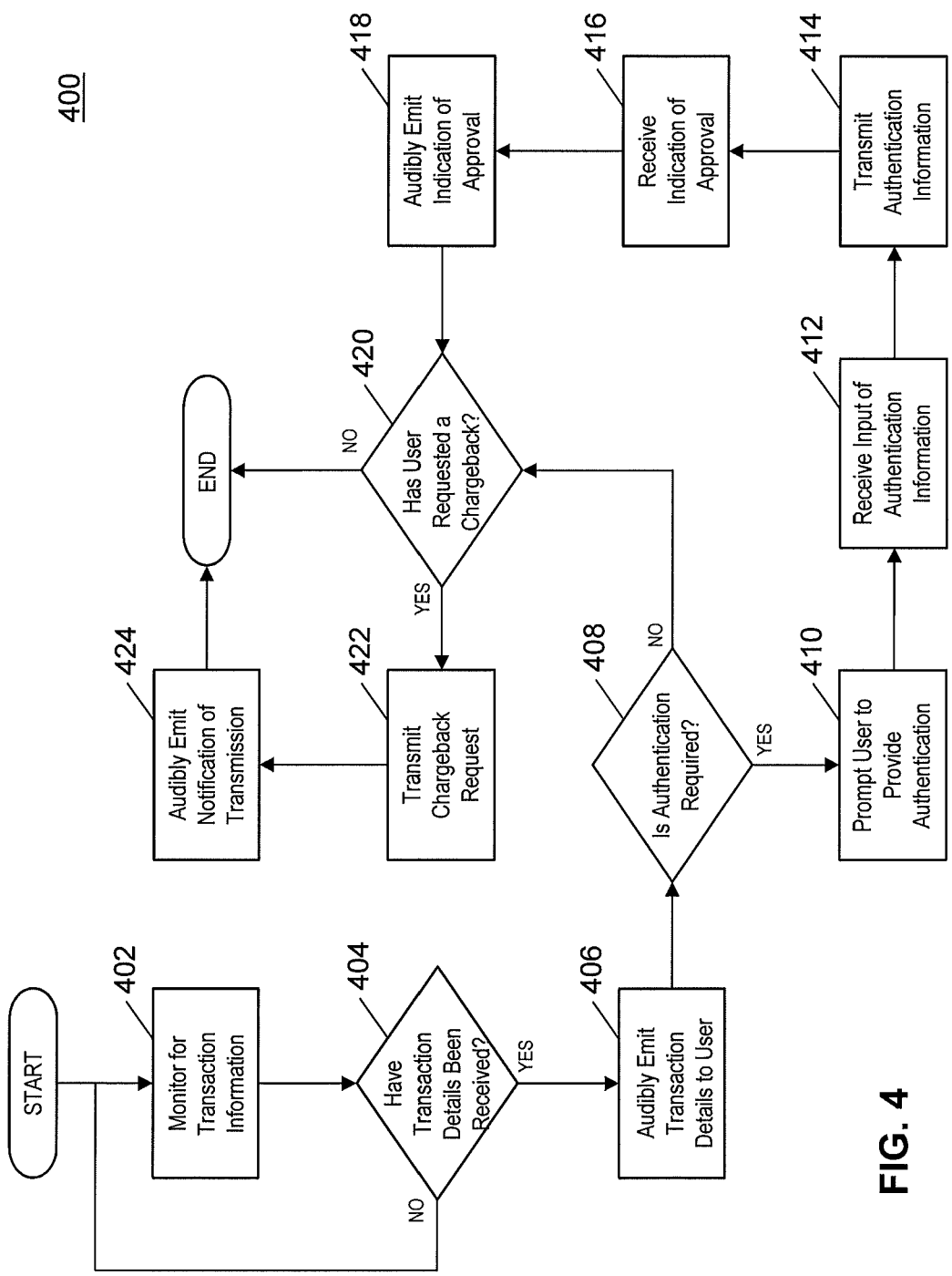
FIG. 4 is a flow chart illustrating a method for audibly communicating transaction details for a financial transaction to a visually impaired consumer in accordance with exemplary embodiments.

FIG. 4 illustrates a method 400 for the receipt and communication of transaction details for a financial transaction to a visually impaired consumer via the consumer device 104.

In step 402, an application program in the memory 202 may operate in the background of the consumer device 104 to monitor for the receipt of transaction information. In step 404, the processing unit 206 may (e.g., executing the application program) determine if transaction details have been received by the receiving unit 210. If no details have been received, then the method 400 may return to step 402 to continue to monitor.

If details have been received, then, in step 406, the consumer device 104 may audibly emit transaction details to the consumer 102. In an exemplary embodiment, the transaction details may include a transaction amount for the financial transaction. In some instances, the transaction details may be received as an audio file, which may be automatically played (e.g., via the audio transmitter 212) upon receipt. In other instances, the transaction details may be received as text, which may be converted into an audio signal by the processing unit 206 using methods that will be apparent to persons having skill in the relevant art.

In some embodiments, the transaction details may be transmitted to the consumer 102 for authorization by the consumer 102 prior to the processing of the financial transaction, but it is envisioned that the authorization process will be completed or ongoing as the transaction details are conveyed to the consumer, so as to not involve an unacceptable delay in the authorization process necessitated by consumer interaction. In step 408, the processing unit 206 may determine if such authorization by the consumer 102 is required, such as by identifying an indication of authorization included in the transaction details received by the receiving unit 210. If authorization is required, then, in step 410, the consumer device 104 may prompt the user to provide authentication. In an exemplary embodiment, the prompt may be made audibly (e.g., by the audio transmitter 212 and speaker 214) to assist a visually impaired user.

In step 412, the input unit 216 may receive input of authentication information from the consumer 102. In an exemplary embodiment, the input may be voice input, such as the consumer 102 audibly providing a personal identification number (PIN) or other authentication information to the input unit 216, which may be a microphone. In step 414, the transmitting unit 208 may transmit the authentication information to the processing server 106, which may then process the financial transaction accordingly via the payment network 112 using systems and methods that will be apparent to persons having skill in the relevant art. In step 416, the receiving unit 210 may receive an indication of approval, which may indicate that the transaction has been approved and processed for the previously emitted transaction amount. In step 418, the audio transmitter 212 and speaker 214 may audibly emit the indication of approval to notify the consumer 102 of the approval.

After the transaction has been indicated as approved, or following the emitting of transaction details if the transaction was processed prior to the receipt of the details without additional authorization required, then, in step 420, the processing unit 206 may determine if the consumer 102 has requested a chargeback. The consumer 102 may request remedial action (e.g., a chargeback, a credit, contesting of the charge, filing of a protest or complaint, etc.) by inputting an instruction to the consumer device 104 via the input unit 216, such as by providing an audible command or other type of suitable input as will be apparent to persons having skill in the relevant art. If the consumer 102 has not requested a chargeback, then the process 400 may end as the transaction will have been successfully completed.

If the consumer 102 has requested a chargeback, then, in step 422, the transmitting unit 208 may transmit a chargeback request to the processing server 106 to indicate that the transaction is being disputed. In step 424, the audio transmitter 212 and the speaker 214 may audibly emit a notification to the consumer 102 that the chargeback request is successfully transmitted to the processing server 106.

In some embodiments, the consumer 102 may be prompted (e.g., via the audio transmitter 212 and the speaker 214) to share experience information. Experience information may include a transaction rating or a review, an experience review, or an analysis of accommodations for the visually impaired (e.g., to serve as a guide for other visually impaired consumers). In further embodiments, experience information may be shared with at least one social network (e.g., automatically or upon audible instruction by the consumer 102).

Communicating Account Information to a Visually Impaired Consumer

Figure 5:
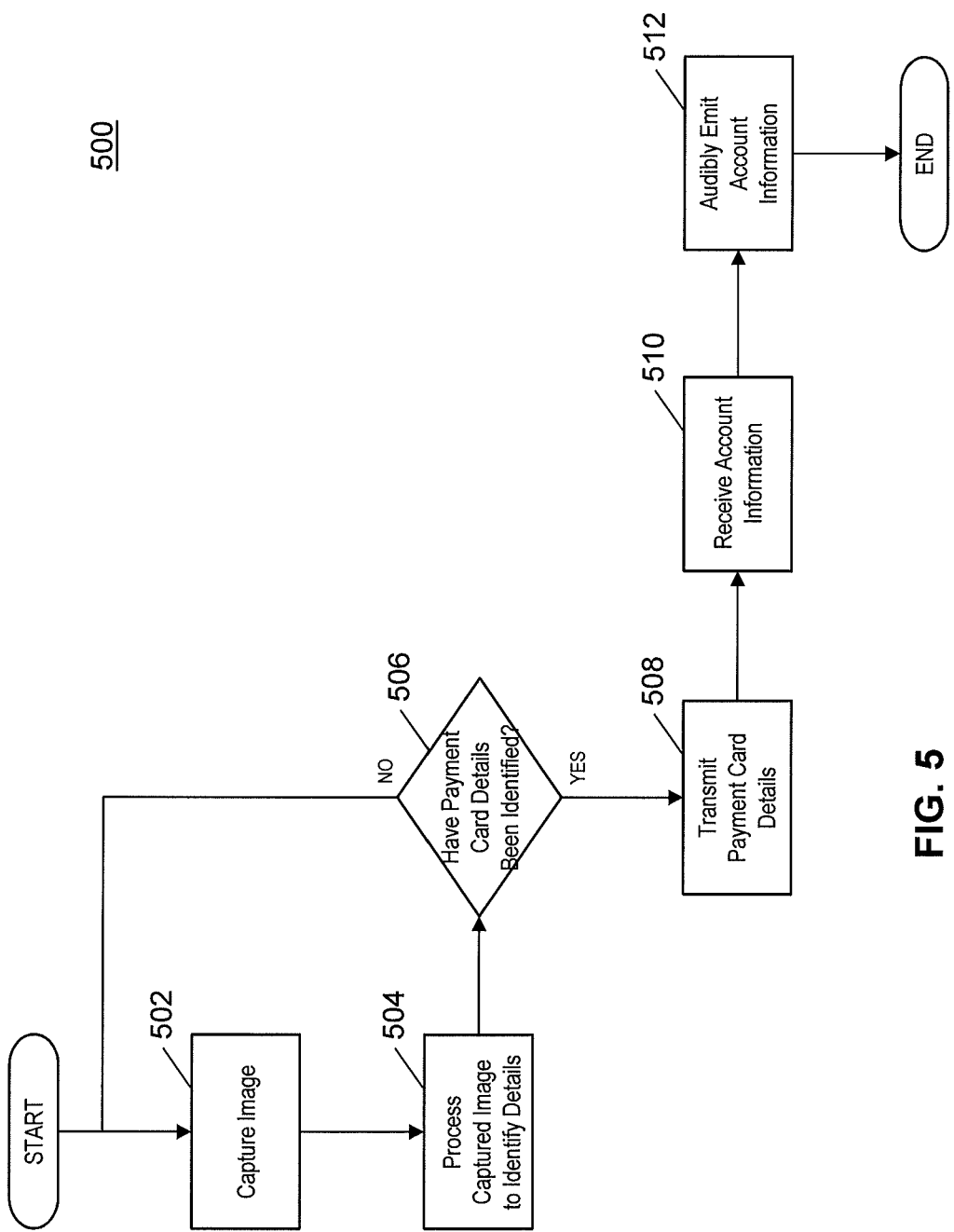
FIG. 5 is a flow chart illustrating a method for audibly communicating account information to a visually impaired user in accordance with exemplary embodiments.

FIG. 5 illustrates a method 500 for audibly communicating account information for a payment card account to a consumer 102 via the consumer device 104.

In step 502, the consumer device 102 may capture an image (e.g., via the imaging unit 204) of the payment card. In step 504, the processing unit 206 may process the captured image to identify payment card details, such as the payment card number. In step 506, the processing unit 206 may determine if the card details were successfully identified. If not, then the consumer 102 may be required to capture the image again. If the card details were successfully identified, then the process 500 may proceed. It will be apparent to persons having skill in the relevant art that steps 502-506 for capturing card details for a payment card may include additional steps or methods, such as illustrated in the method 300 of FIG. 3 and described above.

In step 508, the transmitting unit 208 may transmit the identified payment card details to the processing server 106 or other entity, such as an issuing bank that issued the payment card to the consumer 102. In step 510, the receiving unit 210 may receive account information corresponding to the payment card. In one embodiment, the account information may include at least an available balance. In another embodiment, the account information may include a minimum payment amount, a payment due date, a remaining credit amount, a prepaid spending limit, or an interest rate.

In step 512, the audio transmitter 212 and the speaker 214 may audibly emit the account information to the consumer 102. In some embodiments, the method 500 may be performed via an application program stored in the memory 202 and executed by the processing unit 206 of the consumer device 104. In one embodiment, the account information may be received as a message (e.g., an short message service (SMS) text message) that may be converted to an audio signal, or may be a message (e.g., an MMS message) that includes an audio file.

In some embodiments, method 500 may be modified such that the account information may include location information for nearby automated teller machines (ATMs) where the consumer 102 may be able to make a withdrawal. In such an embodiment, the audio transmitter 212 and speaker 214 may audibly emit directions to the nearest ATM. In an alternative embodiment, the audio transmitter 212 and speaker 214 may audibly emit a list of the closest ATMs, the input unit 216 may receive an input selection (e.g., based on an audible instruction by the consumer 102) of an ATM, and the audio transmitter 212 and speaker 214 may audibly emit directions to the selected ATM.

Method for Communicating Transaction Details for a Financial Transaction

Figure 6A:
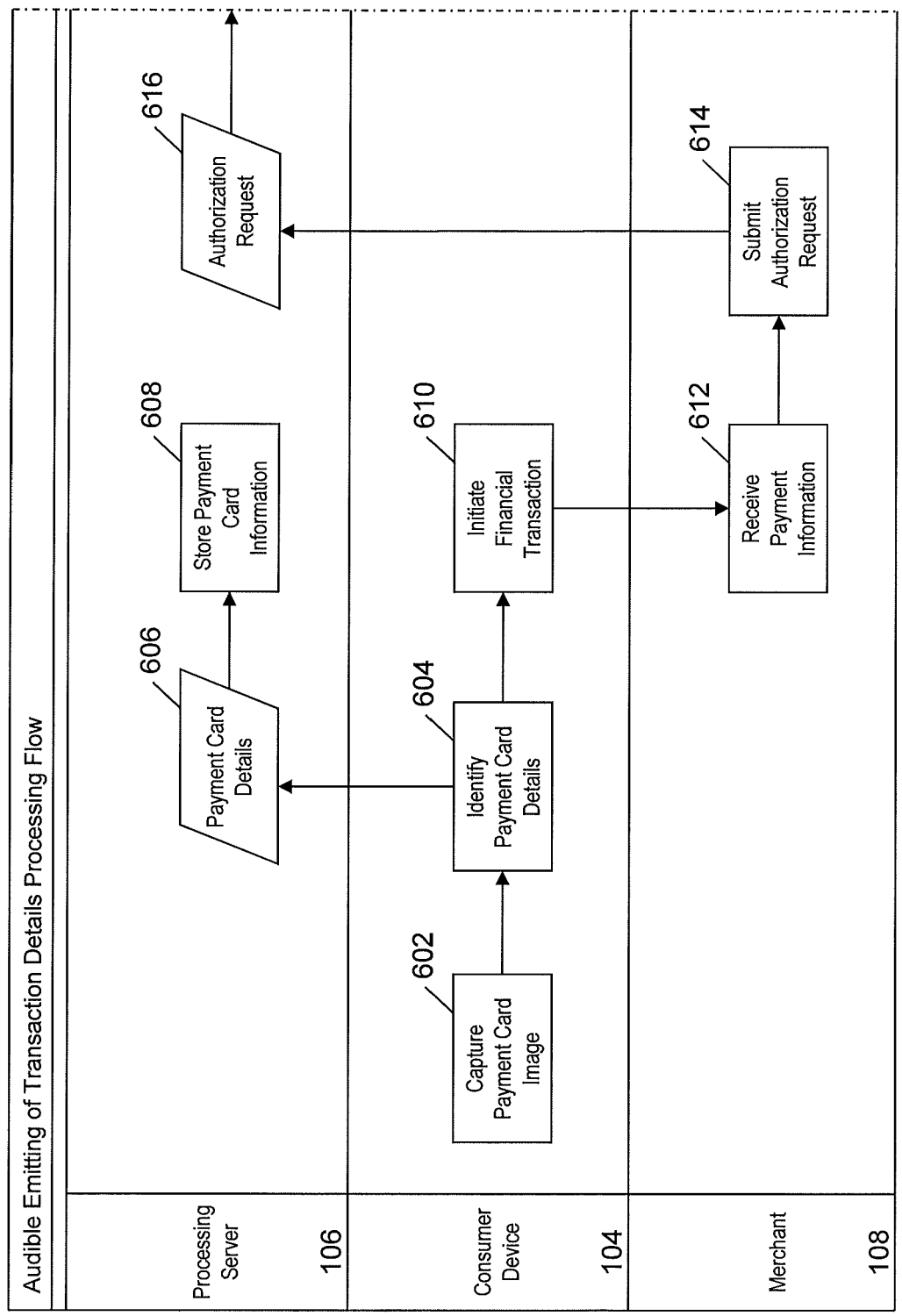
FIGS. 6A and 6B are a processing flow illustrating a method for processing a financial transaction for the visually impaired using the system of FIG. 1 in accordance with exemplary embodiments.
Figure 6B:
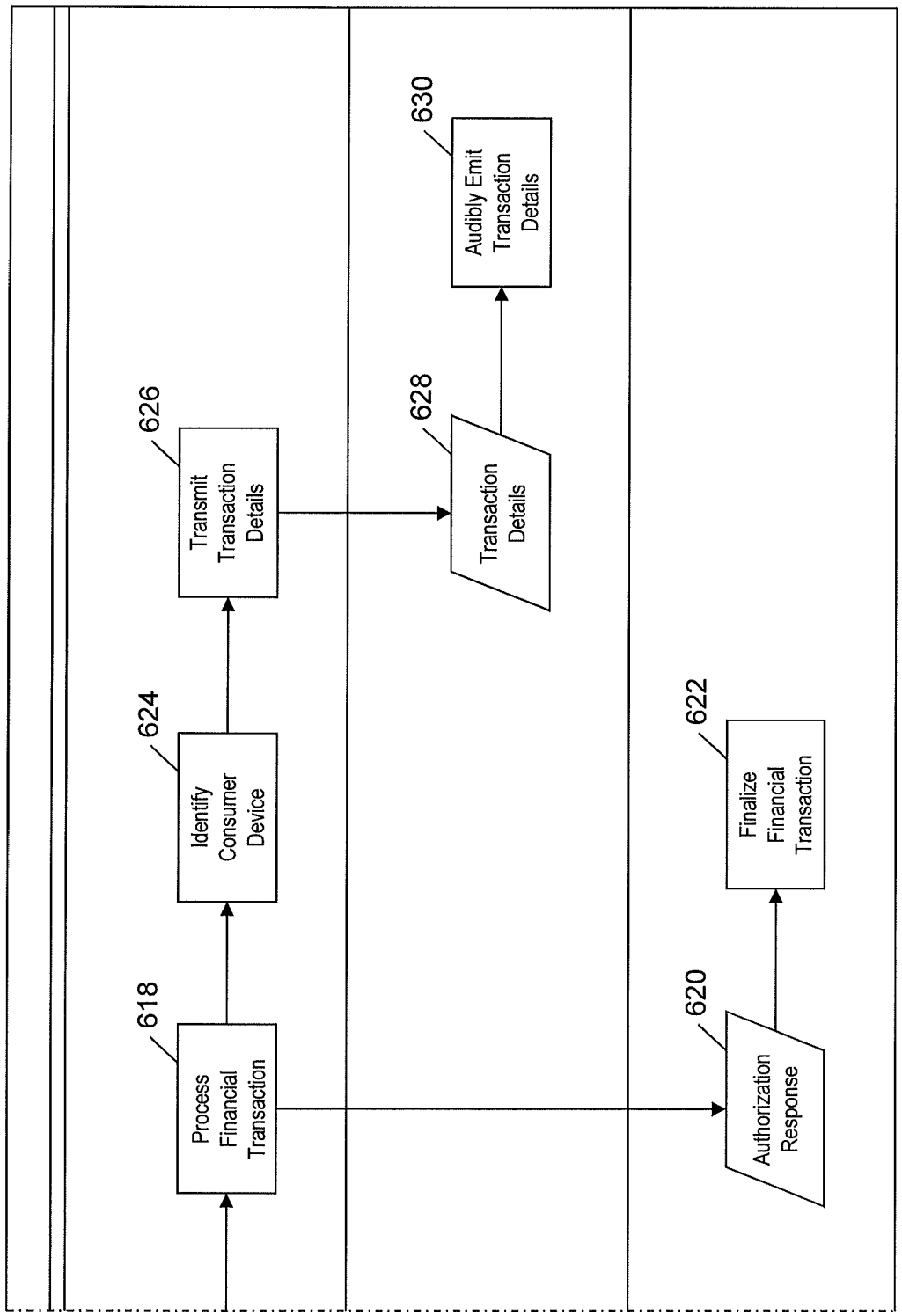

FIGS. 6A and 6B illustrate a flow diagram for a method of communication transaction details to a visually impaired consumer 102 for a financial transaction using the system 100 of FIG. 1.

In step 602, the consumer device 104 may capture an image of a payment card (e.g., via the method 300 illustrated in FIG. 3). In step 604, the consumer device 104 may (e.g., via the processing unit 206) identify card details for the payment card. In one embodiment, card details may include at least a payment card number, and may further include an expiration date, cardholder name, and security code. In step 606, the payment card details may be transmitted to and received by the processing server 106. In step 608, the processing server may store the payment card information, including associating the payment card with the consumer device 104 and/or the consumer 102.

In step 610, the consumer 102 may initiate a financial transaction with the merchant 108 using the payment card. In some embodiments, the financial transaction may be initiated using the consumer device 104 (e.g., using an electronic wallet application). Initiating the financial transaction may include identified goods or services to be purchased and providing the payment card for funding of the transaction. In step 612, the merchant 108 may receive the payment information (e.g., the payment card number corresponding to the payment card) for funding the transaction. In step 614, the merchant 108 may submit an authorization request for the financial transaction for a specific transaction amount to the processing server 106.

In step 616, the processing server 106 may receive the authorization request for the transaction amount indicating the payment card to be used to fund the transaction. In step 618, the processing server 106 may process the financial transaction using methods that will be apparent to persons having skill in the relevant art. As part of the processing of the transaction, the processing server 106 may provide an authorization response, which may be received by the merchant 108 in step 620. The authorization response may indicate the approval or denial of the transaction. In step 622, the merchant 108 may finalize the financial transaction, such as by providing the transacted goods and/or services to the consumer 102.

In step 624, the processing server 106 may identify the consumer device 104 based on the payment card used in the transaction. In step 626, the processing server 106 may transmit transaction details for the processed financial transaction to the consumer device 104. The consumer device 104 may receive the transaction details in step 628, wherein the transaction details may include at least the transaction amount for which the transaction was processed. In step 630, the consumer device 104 may (e.g., via the audio transmitter 212 and the speaker 214) audibly emit the transaction details to the consumer 102.

Computer System Architecture

FIG. 7 illustrates a computer system 700 in which embodiments of the present disclosure, or portions thereof, may be implemented as computer-readable code. For example, the consumer device 104, the processing server 106, and the merchant 108 of FIG. 1 may be implemented in the computer system 800 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-5, 6A, 6B, 8, and 9.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 718, a removable storage unit 722, and a hard disk installed in hard disk drive 712.

Various embodiments of the present disclosure are described in terms of this example computer system 700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 704 may be a special purpose or a general purpose processor device. The processor device 704 may be connected to a communication infrastructure 706, such as a bus, message queue, network (e.g., the network 110), multi-core message-passing scheme, etc. The computer system 700 may also include a main memory 708 (e.g., random access memory, read-only memory, etc.), and may also include a secondary memory 710. The secondary memory 710 may include the hard disk drive 712 and a removable storage drive 714, such as a floppy disk drive, a magnetic tape drive, an optical disk drive, a flash memory, etc.

The removable storage drive 714 may read from and/or write to the removable storage unit 718 in a well-known manner. The removable storage unit 718 may include a removable storage media that may be read by and written to by the removable storage drive 714. For example, if the removable storage drive 714 is a floppy disk drive, the removable storage unit 718 may be a floppy disk. In one embodiment, the removable storage unit 718 may be non-transitory computer readable recording media.

In some embodiments, the secondary memory 710 may include alternative means for allowing computer programs or other instructions to be loaded into the computer system 700, for example, the removable storage unit 722 and an interface 720. Examples of such means may include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art.

The computer system 700 may also include a communications interface 724. The communications interface 724 may be configured to allow software and data to be transferred between the computer system 700 and external devices. Exemplary communications interfaces 724 may include a modem, a network interface (e.g., an Ethernet card), a communications port, a PCMCIA slot and card, etc. Software and data transferred via the communications interface 724 may be in the form of signals, which may be electronic, electromagnetic, optical, or other signals as will be apparent to persons having skill in the relevant art. The signals may travel via a communications path 726, which may be configured to carry the signals and may be implemented using wire, cable, fiber optics, a phone line, a cellular phone link, a radio frequency link, etc.

Computer program medium and computer usable medium may refer to memories, such as the main memory 708 and secondary memory 710, which may be memory semiconductors (e.g. DRAMs, etc.). These computer program products may be means for providing software to the computer system 700. Computer programs (e.g., computer control logic) may be stored in the main memory 708 and/or the secondary memory 710. Computer programs may also be received via the communications interface 724. Such computer programs, when executed, may enable computer system 700 to implement the present methods as discussed herein. In particular, the computer programs, when executed, may enable processor device 704 to implement the methods illustrated by FIGS. 3-5, 6A, 6B, 8, and 9, as discussed herein. Accordingly, such computer programs may represent controllers of the computer system 700. Where the present disclosure is implemented using software, the software may be stored in a computer program product and loaded into the computer system 700 using the removable storage drive 714, interface 720, and hard disk drive 712, or communications interface 724.

Exemplary Method for Audibly Communicating Transaction Details

Figure 8:
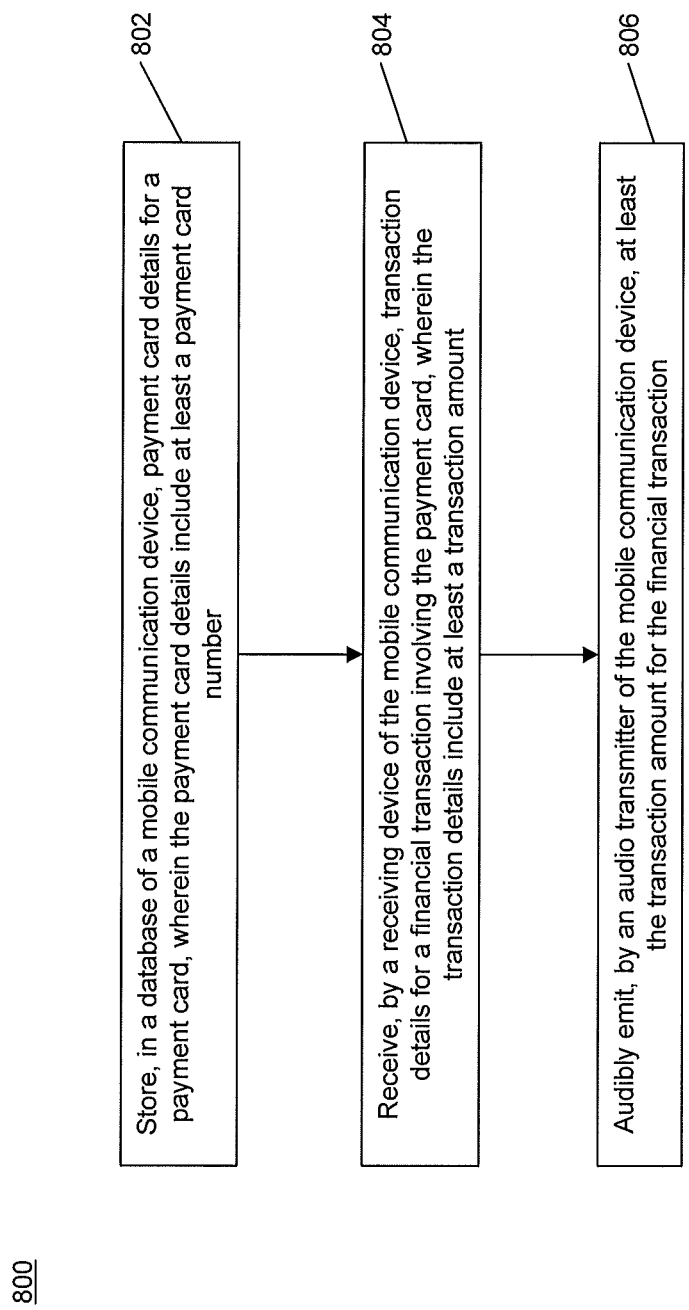
FIG. 8 is a flow chart illustrating an exemplary method for audibly communicating transaction details in accordance with exemplary embodiments.

FIG. 8 illustrates a method 800 for audibly communicating transaction details.

In step 802, payment card details for a payment card may be stored in a database (e.g., the memory 202) of a mobile communication device (e.g., the consumer device 104), wherein the payment card details include at least a payment card number. In some embodiments, the payment card details may further include at least one of: cardholder name, expiration date, and security features.

In one embodiment, step 802 may further include receiving, by a receiving device (e.g., the receiving unit 210) of the mobile communication device 104, the payment card details for the payment card for storage in the database 202. In a further embodiment, step 802 may include capturing, by an imaging device (e.g., the imaging unit 204) of the mobile communication device 104, an image of the payment card, and transmitting, by a transmitting device (e.g., the transmitting unit 208) of the mobile communication device 104, the captured image of the payment card prior to receiving the payment card details.

In an alternative embodiment, step 802 may include capturing, by the imaging device 204 of the mobile communication device 104, an image of the payment card, and processing, by a processing device (e.g., the processing unit 206) of the mobile communication device 104, the captured image of the payment card to identify the payment card details for storage in the database 202. In a further embodiment, the payment card details may be identified using optical character recognition.

In another alternative embodiment, step 802 may further include receiving from the payment card, using near field communication, the payment card details from the payment card for storage in the database 202. In yet another alternative embodiment, step 802 may further include reading, by a reading device of the mobile communication device 104, the payment card details from a magnetic strip included on the payment card for storage in the database 202.

In step 804, transaction details for a financial transaction involving the payment card may be received by a receiving device (e.g., the receiving unit 210) of the mobile communication device 104, wherein the transaction details include at least the transaction amount. In some embodiments, the transaction details may further include at least one of: merchant name, time and/or date, product details, and gratuity.

In step 806, at least the transaction amount for the financial transaction may be audibly emitted by an audio transmitter (e.g., the audio transmitter 212) of the mobile communication device 104. In one embodiment, receiving the transaction details may include receiving a short message service (SMS) message including an audio file, and audibly emitting at least the transaction amount may include playing the included audio file. In a further embodiment, the included audio file may be played automatically upon receipt of the SMS message. In an alternative embodiment, playing the included audio file may be in response to receiving, by the input device 216 of the mobile communication device 104, an audible instruction to play the included audio file.

In one embodiment, the method 800 may further include receiving, by an input device (e.g., the input unit 216), an indication of disapproval of the financial transaction, and transmitting, by the transmitting device 208, the indication of disapproval. In another embodiment, the method 800 may further include audibly emitting, by the audio transmitter 212 of the mobile communication device 104, a prompt for feedback, and receiving, by the input device 216 of the mobile communication device 104, a user response to the prompt for feedback. In a further embodiment, the user response may be at least one of: a transaction rating, a transaction review, an experience review, and an analysis of accommodations for the visually impaired. In another further embodiment, the user response may be shared with at least one social network. In some further embodiments, the input device 216 may be a microphone.

Exemplary Method for Audibly Communicating Account Information

Figure 9:
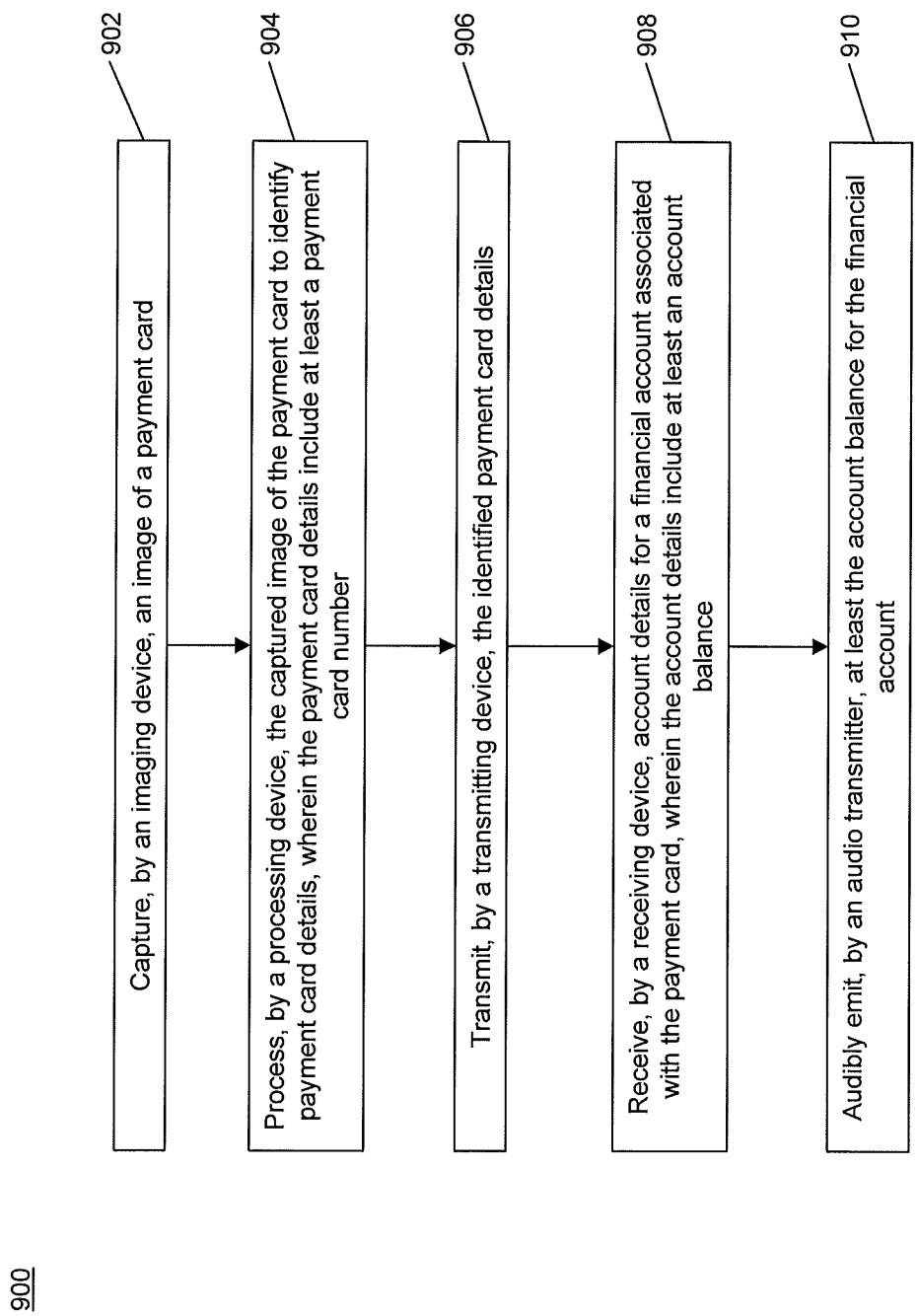
FIG. 9 is a flow chart illustrating an exemplary method for audibly communicating account information in accordance with exemplary embodiments.

FIG. 9 illustrates a method 900 for audibly communicating account information to a consumer 102.

In step 902, an image of a payment card may be captured by an imaging device (e.g., the imaging unit 204). In step 904, the captured image of the payment card may be processed, by a processing device (e.g., the processing unit 206), to identify payment card details, wherein the payment card details include at least a payment card number. In one embodiment, the payment card details may further include at least one of: cardholder name, expiration date, and security features. In some embodiments, the payment card details may be identified using optical character recognition.

In step 906, the identified payment card details may be transmitted by a transmitting device (e.g., the transmitting unit 208). In step 908, account details for a financial account associated with the payment card may be received, by a receiving device (e.g., the receiving unit 210), wherein the account details include at least an account balance. In one embodiment, the account details may further include at least one of: a minimum payment amount, a payment due date, a credit limit, a remaining credit amount, a prepaid spending limit, and an interest rate. In step 910, at least the account balance for the financial account may be audibly emitted by an audio transmitter (e.g., the audio transmitter 212).

Techniques consistent with the present disclosure provide, among other features, systems and methods for providing financial transactions to the visually impaired. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for audibly communicating transaction details, comprising:

capturing, by a reading unit of a mobile communication device of a consumer, payment card data from a payment card;

processing, by a processing device of the mobile communication device, the captured payment card data to identify and store payment card details for a payment card account;

storing, in a database of the mobile communication device, the payment card details, as identified by the processing device, for the payment card account, wherein the payment card details for the payment card account include at least a payment card number;

receiving, by a receiving device of the mobile communication device, from a transaction processing server, transaction details included in an authorization request for a financial transaction (i) that involves the payment card account and (ii) which was processed by said transaction processing server;

identifying, by the processing device of the mobile communication device, a transaction amount included in the transaction details received by the receiving device from the transaction processing server;

causing, by the processing device of the mobile communication device, an audio transmitter of the mobile communication device to audibly emit at least the transaction amount of the financial transaction that was included in the transaction details received by the receiving device of the mobile communication device and identified by the processing device of the mobile communication device;

receiving, by the processing device of the mobile communication device, a verbal command, from the consumer of the mobile communication device, requesting remedial action when at least the audible emitted transaction amount of the financial transaction is being disputed; and transmitting, by a transmitting device of the mobile communication device, to the transaction processing server, at least one of a chargeback request and a credit request in response to the verbal command received from the consumer.

2. The method of claim 1, wherein the reading unit is an imaging device of the mobile communication device, and the capturing of the payment card data includes capturing an image of the payment card the method further comprising:

transmitting, by a transmitting device of the mobile communication device, to the transaction processing server, the captured image of the payment card.

3. The method of claim 1, wherein
the reading unit is an imaging device of the mobile communication device,
the capturing of the payment card data includes capturing an image of the payment card, and
the processing includes processing, by the processing device of the mobile communication device, the captured image of the payment card.

4. The method of claim 3, wherein the payment card details are identified, by the processing device of the mobile communication device, using optical character recognition.

5. The method of claim 1, wherein
the capturing includes capturing, by the reading unit, the payment card data from the payment card, using near field communication.

6. The method of claim 1, wherein
the capturing includes reading, by the reading device of the mobile communication device, a magnetic strip included on the payment card to identify payment card data encoded therein, and
the processing includes decoding, by the processing device of the mobile communication device, the encoded payment card data, read by the reading unit, to identify the payment card details for storage in the database of the mobile communication device.

7. The method of claim 1, wherein receiving the transaction details, by the receiving device of the mobile communication device, includes receiving a short message service (SMS) message including an audio file, and causing the audio transmitter to audibly emit at least the transaction amount includes causing, by the processing device of the mobile communication device, the audio transmitter to audibly emit the included audio file.

8. The method of claim 7, wherein audibly emitting the included audio file is initiated automatically upon receipt of the SMS message.

9. The method of claim 7, wherein audibly emitting the included audio file is initiated in response to receiving, by an input device of the mobile communication device, an audible instruction to play the included audio file.

10. The method of claim 1, wherein the payment card details further include at least one of: cardholder name, expiration date, and security features.

11. The method of claim 1, wherein the transaction details, received by the receiving device of the mobile communication device from the transaction processing server, further include at least one of: merchant name, time and/or date, product details, and gratuity.

12. The method of claim 1, further comprising:
causing, by the processing device, the audio transmitter to audibly emit a prompt for feedback; and
receiving, by an input device of the mobile communication device, a user response to the prompt for feedback.

13. The method of claim 12, wherein the input device of the mobile communication device is a microphone.

14. The method of claim 12, wherein the user response is at least one of: a transaction rating, a transaction review, an experience review, and an analysis of accommodations for the visually impaired.

15. The method of claim 12, further comprising:
sharing, by the processing device of the mobile communication device, the received user response with at least one social network.

16. The method of claim 1, wherein
the transaction details, received by the receiving device from the transaction processing server, are in text form, and
the method further comprises converting, by a processing device of the mobile communication device, the text of the transaction details into an audio signal.

17. A method for audibly communicating account information, comprising:
capturing, by an imaging device of a mobile communication device of a consumer, an image of a payment card;
processing, by a processing device of the mobile communication device, the captured image of the payment card to identify payment card details from the captured image, wherein the payment card details include at least a payment card number;
storing, in a database of the mobile communication device, the identified payment details;
transmitting, by a transmitting device of the mobile communication device, the identified payment card details to a transaction processing server;
receiving, by a receiving device of the mobile communication device, from the transaction processing server, (i) account details for a financial account associated with the payment card, the account details including at least an account balance, and (ii) location information for nearby automated teller machines (ATM) from which the consumer may withdraw funds from the account balance; and
audibly emitting, by an audio transmitter of the mobile communication device, at least (i) the account balance for the financial account and (ii) directions to an ATM at a location closest to the mobile communication.

18. The method of claim 17, wherein the payment card details further include at least one of: cardholder name, expiration date, and security features.

19. The method of claim 17, wherein the account details further include at least one of: a minimum payment amount, a payment due date, a credit limit, a remaining credit amount, a prepaid spending limit, and an interest rate.

20. The method of claim 17, wherein the processing device identifies the payment card details using optical character recognition.

21. The method of claim 17, wherein
account details for the financial account associated with the payment card, received by the receiving device from the transaction processing server, are in text form, and
the method further comprises converting, by the processing device of the mobile communication device, the text of the transaction details into an audio signal.

22. A mobile communication device of a consumer for audibly communicating transaction details, comprising:
a reading unit configured to capture payment card data from a payment card;
a processing device configured to (i) process the captured payment card data and (ii) identify payment card details from the captured payment card data for a payment card account;
a database configured to store the payment card details, as identified by the processing device for the payment card account, wherein the payment card details for the payment card account include at least a payment card number;
a receiving device configured to receive, from a transaction processing server, transaction details included in an authorization request for a financial transaction that (i) involves the payment card and (ii) is being processing by the transaction processing server, wherein the transaction details include at least a transaction amount; and an audio transmitter, of the mobile communication device, configured to audibly emit at least the transaction amount of the financial transaction that was included in the transaction details received by the receiving device, wherein the receiving device is further configured to receive a verbal command, from the consumer of the mobile communication device, requesting remedial action when at least the audible emitted transaction amount of the financial transaction is being disputed, and wherein the mobile communication device further includes a transmitting device configured to transmit, to the transaction processing serer, at least one of a chargeback request and a credit request in response to the verbal command received from the consumer.

23. The mobile communication device of claim 22, wherein the reading unit is an imaging device configured to capture an image of the payment card, and the transmitting device is configured to transmit, to the transaction processing server, the captured image of the payment card.

24. The mobile communication device of claim 22, wherein the reading unit is an imaging device configured to capture an image of the payment card, and the processing device is configured to process the captured image of the payment card and to identify the payment card details for storage in the database of the mobile communication device.

25. The mobile communication device of claim 24, wherein the processing device is configured to identify the payment card details using optical character recognition.

26. The mobile communication device of claim 22, wherein the reading unit is configured to capture the payment card data from the payment card, using near field communication.

27. The mobile communication device of claim 22, wherein the reading unit is configured to read a magnetic strip included on the payment card to identify payment card data encoded therein, and the processing device is further configured to decode the encoded payment card data, read by the reading unit to identify payment card details for storage in the database of the mobile communication device.

28. The mobile communication device of claim 22, wherein the receiving device is further configured to receive the transaction details in a short message service (SMS) message including an audio file, and the audio transmitter is configured to audibly emit at least the transaction amount by playing the included audio file.

29. The mobile communication device of claim 28, wherein the audio transmitter is further configured to play the included audio file automatically upon receipt of the SMS message.

30. The mobile communication device of claim 28, further comprising:

an input device configured to receive an audible instruction to play the included audio file.

31. The mobile communication device of claim 22, wherein the payment card details further include at least one of: cardholder name, expiration date, and security features.

32. The mobile communication device of claim 22, wherein the transaction details, received by the receiving device of the mobile communication device from the transaction processing server, further include at least one of: merchant name, time and/or date, product details, and gratuity.

33. The mobile communication device of claim 22, wherein the audio transmitter is further configured to audibly emit a prompt for feedback, and wherein the mobile communication device further comprises:

an input device configured to receive a user response to the prompt for feedback.

34. The mobile communication device of claim 33, wherein the input device is a microphone.

35. The mobile communication device of claim 33, wherein the user response is at least one of: a transaction rating, a transaction review, an experience review, and an analysis of accommodations for the visually impaired.

36. The mobile communication device of claim 33, wherein the transmitting device is further configured to transmit the received user response to at least one social network.

37. The mobile communication device of claim 22, wherein the transaction details, received by the receiving device from the transaction processing server, are in text form, and the processing device of the mobile communication device is further configured to convert the text of the transaction details into an audio signal.

38. A system for audibly communicating account information, comprising:

an imaging device, of a mobile communication device of a consumer, configured to capture an image of a payment card;

a processing device, of the mobile communication device, configured to (i) process the image of the payment card captured by the imaging device and (ii) identify payment card details from the captured image, wherein the payment card details include at least a payment card number;

a storage device, of the mobile communication device, configured to store the payment card details as identified by the processing device;

a transmitting device, of the mobile communication device, configured to transmit the identified payment card details to a transaction processing server;

a receiving device, of the mobile communication device, configured to receive, from the transaction processing server, (i) account details for a financial account associated with the payment card, the account details including at least an account balance, and (ii) location information for nearby automated teller machines (ATM) from which the consumer may withdraw funds from the account balance; and an audio transmitter, of the mobile communication device, configured to audibly emit at least (i) the account balance for the financial account and (ii) directions to an ATM at a location closest to the mobile communication.

39. The system of claim 38, wherein the payment card details identified by the processing device of the mobile communication device further include at least one of: cardholder name, expiration date, and security features.

40. The system of claim 38, wherein the receiving device of the mobile communication device is further configured to receive, from the transaction processing server, transaction details included in an authorization request for a financial transaction processed by the transaction processing server, said transaction details, received from the transaction include at least one of: merchant name, time and/or date, product details, and gratuity.

41. The system of claim 38, wherein the processing device is configured to identify the payment card details from the captured image using optical character recognition.

42. The mobile communication device of claim 38, wherein
- the account details from the financial account associated with the payment card, received by the receiving device from the processing server, are in text form, and
- the processing device of the mobile communication device is configured to convert the text of the account details into an audio signal.

* * * * *